United States Patent

[11] 3,630,019

[72] Inventor Herwig Kress
 Klocken 5, 7981 Oberzell, Germany
[21] Appl. No. 8,883
[22] Filed Feb. 5, 1970
[45] Patented Dec. 28, 1971
[32] Priority Feb. 6, 1969
[33] Germany
[31] P 19 05 787.5

[54] HEAT-OPERATED PRIME MOVER WITH HYDROSTATIC POWER TRANSMISSION
26 Claims, 9 Drawing Figs.

[52] U.S. Cl. ............................................. 60/19, 60/24, 92/68
[51] Int. Cl. ........................................ F02b 41/00, F03g 7/06
[50] Field of Search ............................. 60/19, 24; 92/68

[56] References Cited
UNITED STATES PATENTS
2,657,528  11/1953  Jonkers et al. .................. 60/24
2,781,647  2/1957  Kohler et al. .................. 60/24 X Primary Examiner—Edgar W. Geoghegan
Attorney—Walter Becker ABSTRACT: A thermal engine with hydrostatic power transfer having reciprocable piston means including working piston means and hydrostatic piston means, in which an eccentrically journaled cylindrical journal is surrounded by an annular body which by at least one sealing surface seals at least one hydrostatic working chamber which is located on that side of the surface of the journal which faces toward said piston means, and in which said annular body has at least two oppositely located guiding extension provided with sealing surfaces which guiding extensions sealingly slide on two sliding surfaces of a slide member while said sliding surfaces are interconnected by at least two arms. The sliding member has at least two extensions preferably forming hydraulic cylinders and having a circular cross section, said extensions being displaceably mounted in a cylinder which is fixedly connected to the housing and being movable in a direction perpendicular to the sliding direction of the sliding surfaces or the sealing surfaces.

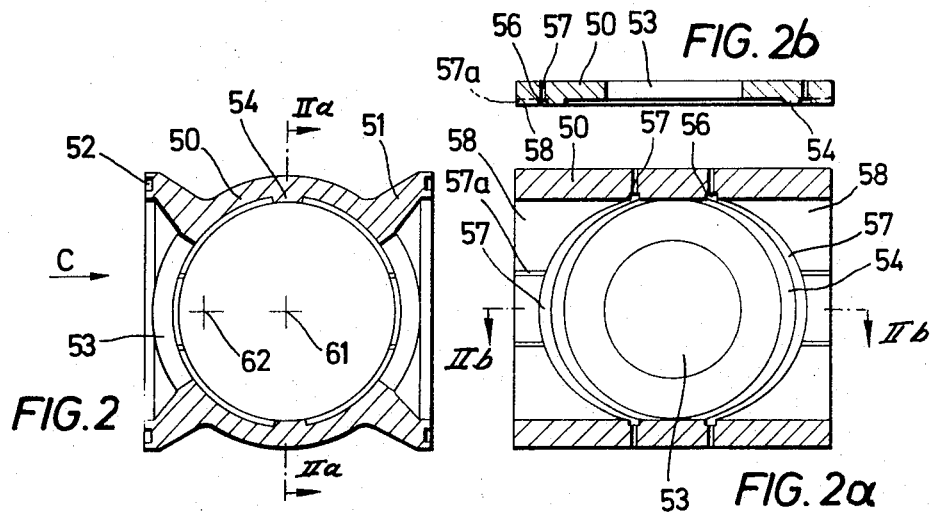
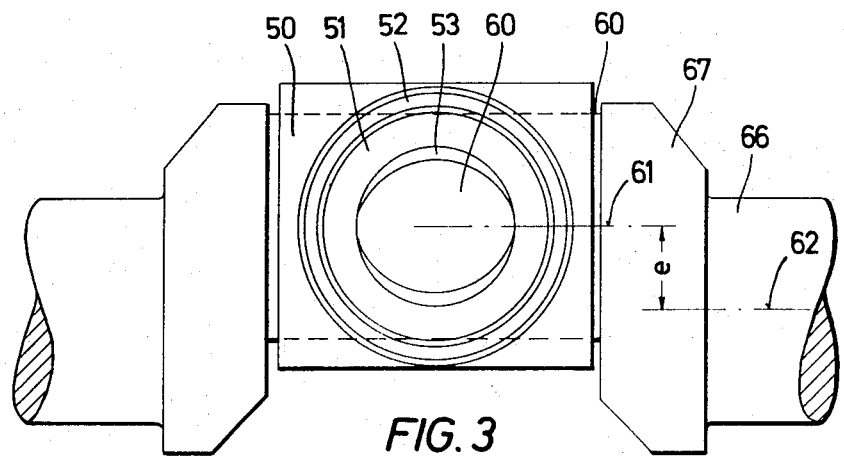
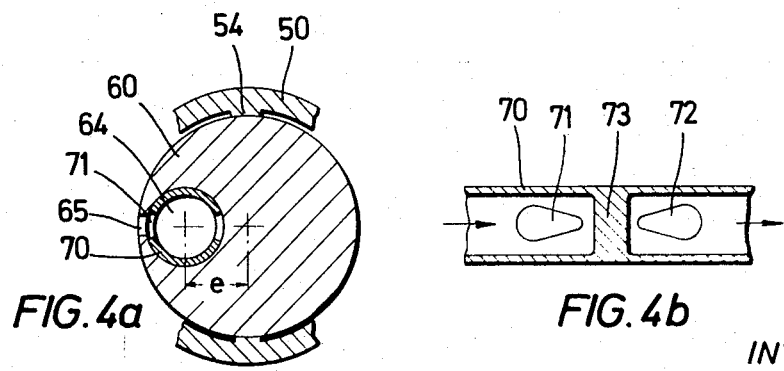

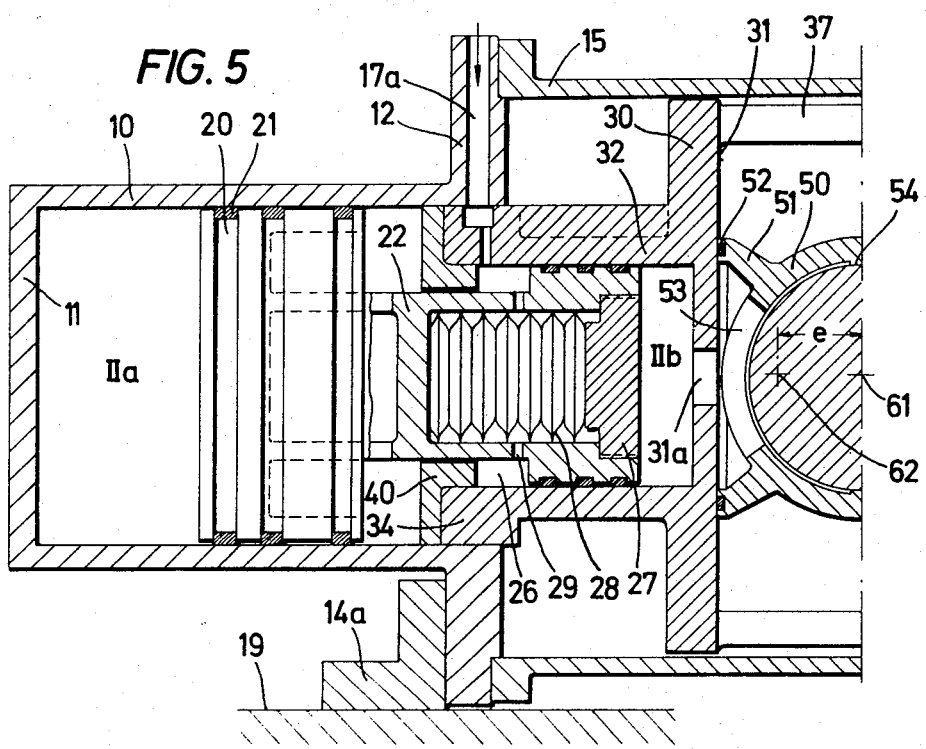
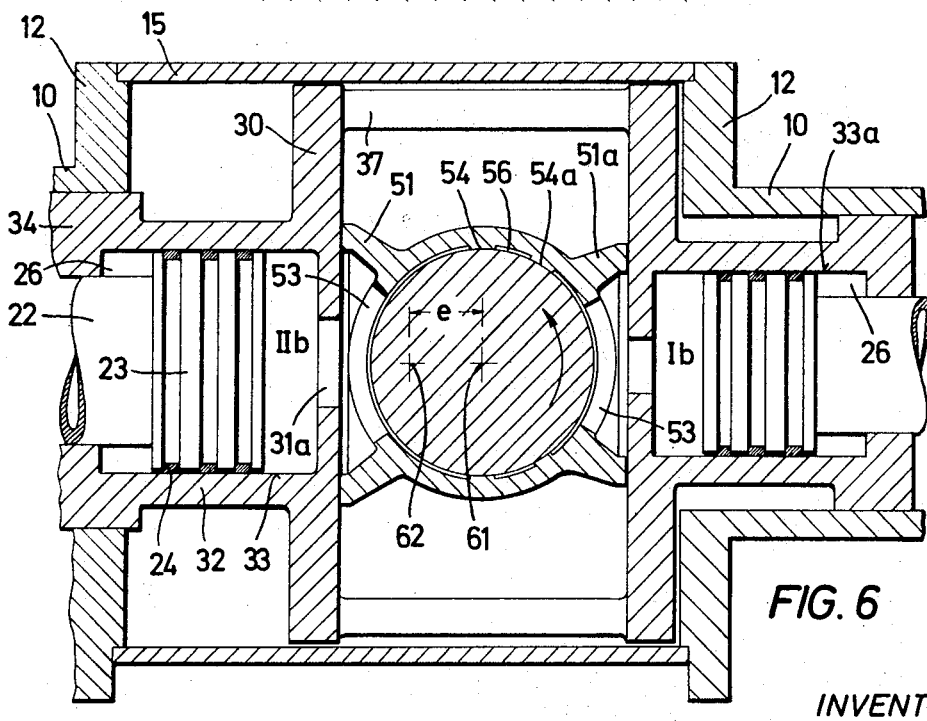

HEAT-OPERATED PRIME MOVER WITH HYDROSTATIC POWER TRANSMISSION

The present invention concerns a thermal engine with hydrostatic power transfer having reciprocable piston means and, more specifically concerns internal combustion engines in which the transfer of the forces acting upon the working piston of the engine to the rotary part of the engine is effected hydrostatically.

It is an object of the present invention to provide an improved machine of the above-mentioned type, while the invention aims in particular purposely at making effective the forces which are hydrostatically transferred from the piston means to the rotary part of the machine without causing the hydraulic fluid within a working cycle to move materially relative to the wall means enclosing the same.

It is a further object of this invention to provide a machine as set forth in the preceding paragraph, in which no material hydrostatic pressures occur during the transfer of the forces from the piston means to the journal of the piston machine, and in which the forces acting upon the piston means will not be increased.

These and other objects and advantages of the invention will appear more clearly from the following specification in connection with the accompanying drawings, in which:

FIG. 2 is a section through a circular body enclosing the journal of a crankshaft of the machine shown in FIG. 1.

FIG. 2a is a section taken along the line IIa—IIa of FIG. 2.

FIG. 2b is a section taken along the line IIb—IIb of FIG. 2a.

FIG. 3 is a view of the circular body of FIG. 2 as seen in the direction of the arrow C and provided with a crankshaft.

Figure 1:
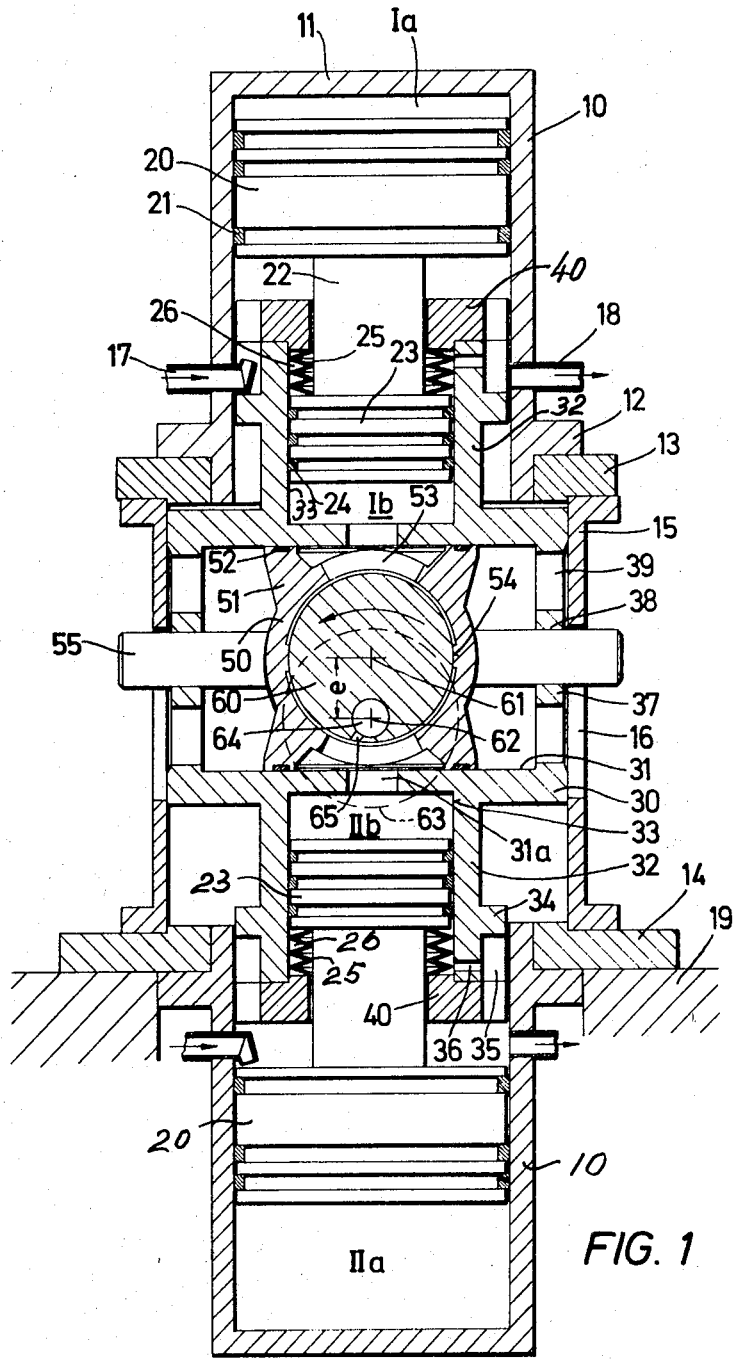
FIG. 1 is a section through an internal combustion engine in which two cylinders are arranged in tandem and in which the transfer of the gas forces produced in the combustion chamber are conveyed to the crank pin by an arrangement according to the invention.

FIGS. 4a and 4b respectively illustrate section through means for replacing the leakage oil losses occurring during the operation of the machine.

FIG. 5 represents a modified arrangement according to the invention and illustrates in section means for realizing the automatic guiding of the hydraulic piston by means of a hydraulic fluid-filled counterpressure chamber instead of a mechanical spring.

FIG. 6 is a section through a modified arrangement according to the invention in which the hydraulic pistons cooperating with a journal are of different dimensions.

The present invention is seen primarily in that an eccentrically journaled cylindrical journal is surrounded by an annular body which by at least one sealing surface seals at least one hydrostatic working chamber which is located on that side of the surface of the journal which faces toward the piston. The annular body has at least two oppositely located guiding extensions provided with sealing surfaces. These guiding extensions sealingly slide on two sliding surfaces of a slide member which sliding surfaces are interconnected by at least two connecting arms. The sliding member has at least two extensions preferably forming hydraulic cylinders and having a circular cross section. These extensions are displaceably mounted in a cylinder which is fixedly connected to the housing and are movable in a direction perpendicular to the sliding direction of the sliding surfaces or the sealing surfaces.

This arrangement is particularly advantageous in connection with the present invention if on at least two oppositely located sides of the eccentrically mounted journal or crankpin of a crankshaft or an eccentric shaft there are arranged one working cylinder and one working piston each.

In this instance, per each crank of a crankshaft or eccentric shaft there are provided at least two working pistons which are displaced relative to each other by 180° crank web. When one of these working pistons is located in its upper dead center point, the other working piston will be located in its lower dead center point and vice versa.

In this connection it is particularly advantageous to provide a hydraulic piston in the hydraulic cylinder mounted on the sliding member, said hydraulic piston being connected to the working piston by means of a piston rod. Such an arrangement brings about that the hydraulic fluid enclosed in the respective hydraulic chamber will, aside from the minor movement caused by the compressibility of the hydraulic fluid, be moved together with the wall surrounding the same as an entirety. Thus, practically no flow losses will occur.

Since with a piston operated machine according to the present invention practically no flow losses occur in the hydraulic chamber, high speeds can be employed. This means, however, that the working piston in the second half of the upward movement to the upper dead center point must be considerably retarded and would detach itself from the fluid and later impact upon the fluid if the hydraulic piston would freely rest upon the hydraulic fluid. Such action can be avoided according to the present invention by providing the hydraulic piston and thereby the working piston with a forced guiding arrangement realized by resting the hydraulic piston through a resilient intermediate member at that side thereof which faces away from the hydraulic chamber against a closure member mounted on the hydraulic cylinder.

The spring characteristic of the resilient intermediate member must be so selected that on one hand the occurring forces will be absorbed and on the other hand the required small strokes will be realized without interrupting the frictional engagement.

A possibility, in this connection to arrive at a favorable solution consists in filling with hydraulic fluid that counterpressure chamber which is located on that side of the hydraulic piston which faces away from the hydraulic chamber. Furthermore, the hydraulic fluid enclosed in said counterpressure chamber should be in direct contact with at least one gas and/or liquid-tight spring element or should be in contact therewith through throttling means.

It has proved advantageous according to the present invention to produce the spring elements as elastic gas-filled hollow bodies, for instance, by welding together correspondingly shaped disklike plates and to mount these hollow bodies in the interior of the hydraulic piston.

The present invention also has solved the problem of replacing the fluid which has leaked out of the counterpressure chamber while a permanent or intermittent supply of hydraulic fluid in the vicinity of the lower dead center point is particularly advantageous, for instance, by temporarily and briefly connecting the feeding line to the counterpressure chamber at the lower dead center point with a hydraulic fluid containing vessel in which a certain pressure prevails.

Furthermore, it is possible according to the invention to increase or reduce over a longer period of time the quantity of hydraulic fluid in the counterpressure chamber to thereby affect the compression ratio of the working cylinder in the reverse manner.

Frequently it has been considered a considerable disadvantage inherent to the heretofore known rotary movement transmitting machines that for this purpose seals for the end faces and the lateral surfaces are necessary because as a result thereof no free movability of the individual structural elements will be assured in view of the different heat expansion. This drawback, however, can be avoided when employing the above-referred-to inventive principle by providing the sealing surface provided on the above-mentioned annular body and sliding on the cylindrical surface of the journal with a closed contour which preferably, when viewed in the direction of the central axis of the working cylinder, is of a circular cross section.

According to the invention it is also advantageous to provide the sealing surface of the guiding extension of the annular body which slides on the sliding member with a closed, preferably circular or elliptical, contour or with a contour composed of an arc and straight lines.

According to a further advantageous development of the invention, it is provided that the hydraulically effective surfaces within that sealing surface of the annular body which slides on the surface of the journal and within that sealing surface of the annular body which slides on the sliding member, on one hand, and the effective surface of the cross-sectional surface of the hydraulic cylinder which is exposed to the pressure of the hydraulic working chamber, on the other hand, equal each other as far as the surface area is concerned.

In order to create defined load conditions with the bodies sliding upon each other, it is advantageous according to the invention to provide a relief groove behind the cylindrical and plane sealing surfaces on the annular body. By at least one relief bore or lubricating groove the leakage escaping from the respective hydraulic chamber is discharged and/or used for lubricating purposes.

According to a further development of the invention, aiming at relieving the sealing surfaces of the annular body which slide on the sliding member, it is provided that the annular body is equipped with two oppositely located guiding members which are displaceable on the sliding surface of the sliding member. The said guiding members are displaceable along correspondingly designed guiding surfaces in the connecting arm of the sliding member and in a direction parallel to the sliding direction of the sealing surface of the annular body.

This last-mentioned additional guiding member may, in conformity with the present invention, be so designed that the guiding member provided on the annular body forms a piston or cylinder, and the guiding surface on the connecting arm of the sliding member forms a cylinder or piston of annular cross section. In such an instance it will be possible, for instance, to use the thus-created working chamber for conveying cooling or lubricating oil or cooling water, or for producing cooling air or air under pressure, or as partial elements of a rotary movement transmitter of a third and fourth working cylinder where the kinetic principle employed with the second and third cylinder is, so to speak, reversed.

With any hydrostatic system working with seals or gaskets, leakage of the hydraulic fluid cannot be avoided. This problem has been solved according to the present invention by providing the journal of the piston engine with at least one bore through which by means of at least one feeding bore hydraulic fluid is conveyed or withdrawn while controlling the conveyed quantity of fluid with regard to time and/or quantity. The problem may also be solved in a different way by the provision of a longitudinally displaceable and/or pivotable but nonrotating central pipe, said pipe being located in the bore of the journal. The said central pipe is provided with at least one inlet opening by means of which the hydraulic fluid to be conveyed to or withdrawn from the hydraulic chamber can be controlled as to time and quantity.

In certain circumstances it is necessary, in view of the heating up of the various structural elements, to withdraw a certain quantity of hydraulic fluid from the hydraulic chamber which fluid is then cooled and subsequently returned to the hydraulic chamber. This may be realized in conformity with the present invention by subdividing the nonrotating central pipe arranged in the journal by a transverse web, and further by providing on one side of the web at least one inlet opening and on the other side of the web at least one outlet opening. It is by means of said openings that the quantity of hydraulic fluid which is simultaneously to be conveyed to the hydraulic chamber and/or to be withdrawn therefrom can be controlled. Since due to the leakage, the quantity to be withdrawn will always be somewhat less than the quantity to be supplied, it is possible by a sensitive or fine longitudinal displacement of the central pipe subdivided by a transverse web to regulate the point which represents an optimum with regard to the distribution of the quantity.

If, for certain reasons, one of the two hydraulic pistons acting upon a rotary movement transmitter has to have a different diameter than the other piston, this may be effected according to the invention by providing that the cross sections which are effectively surrounded by the sealing surfaces of the annular body and/or the cross sections which in the hydraulic cylinders are with regard to the pressure in the hydraulic chamber effectively surrounded as to the surfaces, are on one side of the journal approximately or completely equal to each other, however, on the other side of the journal have a magnitude differing from that of the first-mentioned side. Such an instance is encountered, for example, when one side of the rotary movement transmitter acts upon one side of the forcibly guided hydraulic piston whereas the other side acts upon the surface of the other piston side which is smaller by the cross-sectional surface of the piston rod.

Referring now to the drawings in detail, the arrangement shown therein comprises a working cylinder 10 which is closed by a cylinder cover 11. Reciprocably mounted in cylinder 10 is a piston 20 provided with piston rings 21 by means of which the working chamber 1a is tightly sealed. The upper one of the two pistons 20 shown in FIG. 1 occupies its upper dead center position whereas the lower piston 20 is in its lower dead center position. The valves, ignition devices and injection nozzle customarily employed in connection with machines of this type have been omitted for simplifying the illustration.

Piston 20 is by means of a piston rod 22 connected to the hydraulic piston 23 the piston rings 24 of which tightly seal the hydraulic chamber 1b. Piston 23 is reciprocable in the hydraulic cylinder 32 which is provided with a cylindrical sliding surface 33. Cylinder 32 is fixedly connected to the slide portion 30. Connected to the hydraulic cylinder 32 is a cover 40 on which a spring member 25 rests which is arranged in the counterpressure chamber 26. The hydraulic piston 23 is by means of the pressure exerted by the hydraulic fluid in the chamber 1b, through the intervention of spring member 25, pressed against the cover 40. Therefore, when the influence of the gas forces in the chamber 1a, the hydraulic fluid enclosed in the hydraulic chamber 1b is compressed to a slight degree, the spring member 25 will see to it that a contact between the surface of the hydraulic piston 23 and the hydraulic fluid in the hydraulic chamber will always be maintained.

The spring member 25 is in this instance shown as a leaf spring body, however, it is also possible to employ other spring means.

The slide member 30 is symmetrically designed with regard to the pivot or journal 60. The slide member 30 has sliding surfaces on both inner sides on which sliding surfaces the annular body 50 is adapted to slide in a direction transverse to the cylinder axis.

Through bore 31a in the slide member 30 the oil pressure is conveyed from the hydraulic chamber 1b directly and without the interposition of a bearing upon the journal 60.

The two parts of the slide member 30 are interconnected by two connecting arms 37 so that the two sliding surfaces 31 will always be spaced from each other by the same nonvariable distance. The connecting arms 37 have a guiding bore 38 in which the guiding member 55 moves which is connected to the annular body 50, said guiding member 55 being formed in this instance by a bolt.

In order to permit free movement of the guiding member 55, the housing part 15 is provided with a recess or cutout 16. Housing part 15 connects the two cylinders 10 to the flange 12 in the cylinder 10 and does so through the intervention of the intermediate ring 13 and the supporting ring 14. The hydraulic cylinder 32 is furthermore provided with a guiding extension 34 having a recess or cutout 35. This guiding extension 34 is adapted to slide on the cylinder surface of the cylinder 10 and in this way to center the piston 20 and the hydraulic piston 23.

The recess 35 is required in order to mount the feeding line 17 and to mount the discharge line 18. If desired, a plurality of such lines may be arranged on the circumference of the cylinders.

The leakage fluid escaping from the hydraulic chamber 1b into the counterpressure chamber 26 may through the leakage bore 36 and the discharge line 18 be returned to the circuit. In most instances it is expedient to use lubricant oil as hydraulic fluid.

The annular body 50 provided between the two sliding surfaces 31 of the sliding member 30 has on both sides one annular guiding extension 51 each in which the annular seal 52 is provided. In order to permit the pressure which builds up in the hydraulic chambers Ib, IIb to propagate to the journal 60, the annular body 50 is on both sides thereof provided with one relief bore 53 each. The two hydraulic chambers Ib and IIb are sealed relative to each other by sealing surfaces 54 provided on the annular body 50. With this embodiment, this sealing surface 54, when viewed from the cylinder axis, has a circular cross section projected on the inner diameter of the annular body 50.

If the inner diameter of the sealing surface 54 equals the effective diameter of the sealing surface 52, and furthermore equals the inner diameter of the hydraulic piston 32, the sliding member 30 as well as the annular body 50 are practically relieved from the oil pressure in the hydraulic chambers Ib and IIb.

The central axis 61 of the journal 60 is eccentrically arranged relative to the central axis 62 of the base bearing of the crankshaft. The magnitude of the eccentricity is designated with the letter e. FIG. 1 shows the contour of the base bearing in dash lines designated with the reference numeral 63.

In order to prevent the working pressure occurring in the hydraulic chambers Ib and IIb from dropping below a certain desired value, the quantity of leakage oil escaping from these chambers has to be replaced. This is effected with the embodiment shown in the drawings through bores 64 and through pressure oil guiding means 65 in the journal 60.

By turning the journal 60, sequentially both hydraulic chambers Ib and IIb are through bore 64 provided with oil. In this connection it is advantageous to provide a check valve set for a certain pressure so that only during a certain angle range near the upper dead center point hydraulic fluid can be supplied. If one of the two sides should loose a larger quantity of leakage oil than the other side, such check valve (not shown) can bring about a certain equalization due to the fact that this check valve will keep open the feeding line for a somewhat longer period of time and will thereby equalize the originally prevailing difference.

The purpose of the above-mentioned guiding member 55 consists in that it helps to avoid a tilting of the sealing surface 52 on the sliding surface 31. In this way the sealing surfaces are saved and a longer trouble-free period of operation will be assured. However, it is also possible to do without these additional guiding means if, for instance, the sealing surface 52 has not a circular contour but forms a transverse longitudinal ellipse the surface area of which is identical with the projected diameter of the sealing surface 54 or the projected diameter of the inner surface of the oil cylinder 32. In this instance the balance of the forces is not interfered with or disturbed. However, in this way, there is obtained the possibility to increase the eccentricity e and thereby to increase the working stroke of the working pistons 20. Instead of the elliptical shape, also any other closed contour extending in longitudinal direction and in the direction of the axes of the guiding bolts 54 may be selected provided that the above-mentioned condition of surface equality is met.

With regard to the structural elements shown in FIG. 1, it may be added that the foundation is designated with the reference numeral 19 and that the relief bores 39 provided in the connecting arms 37 have the purpose of reducing the weight. It may furthermore be mentioned that around the housing part 15 there is provided an enclosing hood (not shown in the drawing), and that various structural elements which are shown in one piece in the drawing for the sake of simplicity, may be composed of two or more parts.

FIG. 2 illustrates by way of several sections how the annular body 50 according to the invention may expediently be designed in order to be able to carry out the various functions referred to above. The section shown in FIG. 2a approximately corresponds to the section through the annular body in FIG. 1, however, without the guiding member 55.

FIG. 2b illustrates the section 2b—2b through FIG. 2a. The sealing surface 54 which is important for the operation of the annular body 50 is produced in such a way that depressions are milled into the bore which is originally produced with the diameter of the journal 60. The said depressions will within the interior of the circular projection of the seal 54 permit the hydraulic fluid in the hydraulic chambers Ib and IIb freely to enter up to the sealing surface 54 proper.

In order to assure a defined surface pressure, a narrow relief groove 56 is milled behind the sealing surface 54, and the relief bores 57 will see to it that the leakage oil entering the groove 56 can unimpededly flow off toward the outside. The lubricating groove 57a illustrated in dash lines in FIGS. 2b and 2c may have a similar function. In this way no pressure beyond control can build up between the now considerably increased guiding surface 58 of the annular body 50 which surface 58 has the same diameter as the journal. On the other hand, this guiding surface is necessary in order to assure a sufficiently long life of the annular body 50.

FIG. 2b represents a section taken along the line 2b—2b of FIG. 2a and, more specifically, a tangential projection, i.e. so to speak a section through the developed annular body 50.

FIG. 3 shows a view of the annular body 50 together with a crankshaft which comprises the journal 60, the crank web 67 and trunnion or base bearing pin 66 through which work or output drive is accomplished (a coupling not shown in FIG. 3 is connected with base bearing pin 66). Purpose of the invention is served in that back-and-forth or to-and-fro forces effective upon the piston of an internal combustion machine are transmitted over a hydraulic "linkage" system into rotating movement of a shaft including base bearing pin 66. The axis of the journal is designated with the reference numeral 61, and the axis of the base bearing pin is designated with the reference numeral 62. FIG. 3, when viewed in the direction C of FIG. 2a, clearly shows that the annular body 50 has a circular ring seal which, in conformity with FIG. 1, is adapted to slide on the sliding surfaces 31 of the sliding member 30. Correspondingly, also the guiding extension 51 has a frustoconical shape.

If it is desired to increase the eccentricity e and thereby the stroke of the working piston 20, it would be necessary to design the sealing surface 52, which in the drawing is shown as an annular sealing surface, in the form of an upright ellipse the same surface area so that in such an instance the bore 31a in slide member 30 necessary for the connection of the working chambers Ib and IIb with the journal 60 will at no time be covered by the seal 52. Instead of the ellipse, also a seal having a contour composed of arcs and straight connecting lines may be employed.

With this embodiment and also with the embodiment of FIG. 1 it is assumed that the sliding surface 31 is a plane surface. However, it would also be possible to design the sliding surface in the form of a partially cylindrical surface with the axis thereof extending in the direction of the sliding surface.

FIG. 4a shows a modification over FIG. 1 and, more specifically, illustrates how, in conformity with the invention, under certain conditions the feeding of the hydraulic fluid to the hydraulic chambers Ib and IIb may be effected. To this end, in the interior of the bore 64 of the journal 60 there is provided a stationary central pipe 70 which may have two oppositely located bores 71. In FIG. 4a there is also indicated the location of the annular body 50 and of the sealing surface 54. In the illustrated position, which corresponds to that of FIG. 1, in other words the working chamber IIa of the working cylinder 10 occupies its lower dead center point, it is possible through the feeding line 65 in the journal 60 to convey hydraulic fluid into the hydraulic chamber IIb.

After a 180° crank angle, the hydraulic chamber Ib occupies its lower dead center point, and now hydraulic fluid is supplied into the hydraulic chamber Ib through the oppositely located inlet opening 71.

FIG. 4b illustrates how such stationary central pipe 70 may be employed not only to supply hydraulic fluid for making up the leakage losses but may also at a certain continuous rate withdraw a certain quantity of hydraulic fluid from the hydraulic chambers Ib and IIb in order to cool the oil.

Aside from the compression movement of the hydraulic fluid in the working chambers Ib and IIb, no movement proper of the hydraulic fluid occurs in said working chambers. Furthermore, the various structural elements are with regard to the hydraulic pressure completely relieved from hydrostatic pressure when the principle of the present invention is met. Nevertheless, a certain frictional heat will develop so that sometimes it will not be sufficient to cool the hydraulic cylinder 32 from the outside.

A proper cooling may, however, be realized by means of the two sections of the stationary central pipe 70 which are separated from each other by a transverse web 73, in the following manner. The hydraulic fluid to be replaced and also the quantity of hydraulic fluid to be withdrawn are fed from the left-hand side—with regard to the drawing—to the inner chamber of the stationary central pipe 70. In this way, the oil will within a certain angle, which may be controlled by the tapering control contour of the inlet opening 71, enter the hydraulic chamber Ib, IIb through the feeding bore 65. If the journal 60 at a certain suitable distance has a further bore 65, it is possible simultaneously through the discharge opening 72 to discharge toward the outside a certain quantity of hydraulic fluid.

Depending on how the longitudinally displaceable and pivotable but nonrotating central pipe 70 is adjusted, it is possible in view of the shape of the tapering control edge of the inlet and outlet opening 71 and 72, to effect a certain displacement of the withdrawn quantity of leakage oil with regard to the total supplied quantity of hydraulic fluid.

The supply of this hydraulic fluid is in many instances expediently so effected that in a storage container a certain quantity of hydraulic fluid is stored the pressure of which is higher than the pressure which prevails in the hydraulic chamber within the range of the lower dead center point of the hydraulic piston. It will be appreciated that in such circumstances, with each rotation, a certain quantity of hydraulic fluid flows into the hydraulic chambers Ib and IIb and, more specifically, until a pressure equilibrium has been established between the pressure in the storage container and the pressure in the hydraulic chambers Ib and IIb within the range of the lower dead center point.

When the distance of the bores in the journal 60 for the feedline 65 is selected greater than the distance between the inlet bore 71 and the outlet bore 72, it is possible simultaneously to supply hydraulic fluid and to withdraw hydraulic fluid for cooling purposes.

FIG. 5 shows a further embodiment of an internal combustion engine according to the invention similar to FIG. 1, in which the spring member for the automatic guiding of the hydraulic piston 22 may be realized by filling the counterpressure chamber 26 with hydraulic fluid and establishing a connection to the hollow hydraulic piston 22 through a throttle area 29. In order to design the spring characteristic of this filling somewhat flatter, air-filled spring means 28 are provided in the interior of the hydraulic piston 23 and of the piston rod 22. These spring means 28 may, in this instance, consist of pressed sheet metal parts which at the outer marginal area are welded together in a gastight and liquidtight manner. The interior of the hydraulic piston is closed by a stopper 27 which is screwed into the hydraulic piston 23.

When the pressure in the counterpressure chamber 26 is increased, the individual disk-shaped spring elements 28 are, when suitably dimensioned, compressed to a relatively great extent and a considerable flattening of the entire spring characteristic of the counterpressure chamber 26 including the spring elements 28 will result.

The purpose of the throttling area 29 consists in that the oscillating system comprising the hydraulic piston 23, the hydraulic chamber Ib, IIb and the counterpressure chamber 26, is subjected to a certain cushioning and damping effect in order to obtain a uniform movement of the working piston 20.

When the piston 20 occupies its FIG. 5 position, it is in its lower dead center point position. It is expedient in this position of the piston 20 to replace a quantity of leakage oil which escapes from the counterpressure chamber or to remove the excessive leakage oil which enters the counterpressure chamber 26 from the hydraulic chamber Ib, IIb. To this end, there is provided the feeding line 17a which communicates with a container (not shown) in which a certain pressure is maintained. If the pressure in the container is greater than the pressure of the hydraulic fluid in the counterpressure chamber 26 in the area of the lower dead center point, a corresponding quantity of hydraulic fluid will enter the counterpressure chamber 26 during the time during which a communication exists between the counterpressure chamber 26 and the line 17a. The situation is reversed, when the pressure drop is in the opposite direction.

Thus, by changing the pressure in the said container, it is possible to vary the filling of the counterpressure chamber 26 within certain limits and in this way to control the compression ratio of the internal combustion engine prior to or during the operation thereof. It is a matter of course that this control must be in conformity with a corresponding change of the filling in the hydraulic chamber Ib or IIb.

FIG. 6 illustrates how, when maintaining the basic principles of the invention, it is possible to assure a cooperation of differently dimensioned piston systems with one and the same journal 60. In this instance, for each piston side by itself the condition has to be met that the effective cross sections of the various sealing areas of the annular body and the hydraulic cylinders pertaining thereto are substantially or completely equal. Accordingly, in FIG. 6 with the annular body 50, on both sides the dimensions of the guiding extensions 51 and 51a and of the sealing surfaces 54 and 54a and the diameters of the cylinder running surfaces 33 and 33a of the hydraulic cylinder 32 differ from each other.

It is, of course, to be understood that the present invention is, by no means, limited to the particular showing in the drawings but also comprises any modifications within the scope of the appended claims.

What is claimed is:

1. A reciprocable piston engine which includes: piston means comprising at least one reciprocable piston operable by a gaseous medium and forming a working piston, at least one hydrostatic cylinder in substantially axial alignment with said working piston and reciprocable in the axial direction of said working piston, a hydrostatic piston connected to said working piston and reciprocable in said hydrostatic cylinder for converting the reciprocatory movement of said working piston into a rotary movement, said hydrostatic cylinder together with said hydrostatic piston defining hydrostatic chamber means, an eccentrically journaled journal, an annular body surrounding said journal and substantially sealing said hydrostatic chamber means, and a sliding body connected to said hydrostatic cylinder for reciprocation therewith, said sliding body being provided with sealing surface means, and said annular body being provided with a sealing area sealingly engaging said sealing surface means.

2. An engine according to claim 1, which includes at least two pairs of interconnected working and hydrostatic pistons on opposite sides of said journal.

3. An engine according to claim 1, in which said working piston and said hydrostatic piston are interconnected by a piston rod.

4. An engine according to claim 1, which includes cover means closing that end of said hydrostatic cylinder which is adjacent said working piston, and also includes spring means interposed between the cover means and the hydrostatic piston.

5. An engine according to claim 1, in which said annular body is provided with sealing means of a closed contour sealingly engaging the peripheral surface of said journal.

6. An engine according to claim 1, in which the sealing area of said annular body which sealingly engages the sealing surface means of said sliding body has a closed contour.

7. An engine according to claim 6, in which said closed contour is elliptical.

8. An engine according to claim 6, in which said closed contour is circular.

9. An engine according to claim 6, in which said closed contour is composed of rectilinear and curved sections.

10. An engine according to claim 1, in which said sliding body is provided with guiding surfaces extending in a direction substantially parallel to said sealing surface means, and in which said annular body is provided with at least two oppositely located guiding means slidably engaging said guiding surfaces.

11. An engine according to claim 10, in which said guiding means are formed by piston means, and in which said guiding surfaces are cylindrical surfaces slidably receiving said piston means.

12. An engine according to claim 10, in which said guiding means form cylinders, and in which said guiding surfaces form pistons engaged by said cylinders.

13. An engine according to claim 5, in which the sealing area and sealing means of said annular body have associated therewith relief passage means for discharging hydraulic fluid escaped from said hydrostatic chamber means.

14. An engine according to claim 1, in which that portion of said hydrostatic cylinder which is located on that side of the hydraulic piston which faces away from said journal forms a counterpressure chamber and is filled with hydraulic fluid.

15. An engine according to claim 14, in which the hydraulic fluid in said counterpressure chamber is in communication with at least one fluidtight spring means.

16. An engine according to claim 14, in which the hydraulic fluid in said counterpressure chamber communicates with at least one fluidtight spring means through throttling means.

17. An engine according to claim 15, in which said spring means is arranged within the interior of the hydraulic piston.

18. An engine according to claim 15, in which at least one of said spring means includes an elastic gas-filled hollow body.

19. An engine according to claim 14, which includes control means for controlling the hydraulic fluid enclosed in said counterpressure chamber with regard to the quantity thereof.

20. An engine according to claim 1, in which said journal has at least one bore adapted to be brought into communication with said hydrostatic chamber means for controlling the flow of fluid therebetween.

21. An engine according to claim 20, which includes tubular means nonrotatably but movably arranged in said bore, said tubular means being provided with inlet opening means for controlling the hydraulic fluid to be supplied to and withdrawn from said hydrostatic chamber means.

22. An engine according to claim 21, in which said tubular means is subdivided by a partition and in which said inlet opening means is provided on one side of said partition whereas at least one outlet opening means is provided on the other side of said partition for simultaneously controlling the hydraulic fluid to be conveyed to or withdrawn from said hydrostatic chamber means.

23. An engine according to claim 1, which includes at least two pairs of interconnected working and hydrostatic pistons respectively located on opposite sides of said journal, and in which said annular body engages the peripheral surface of said journal at opposite sides thereof along strip-shaped sealing surfaces, said annular body together with the peripheral surface portions of said journal between said strip-shaped sealing surfaces defining portions communicating with the respective adjacent hydrostatic chamber means, the hydraulically effective surfaces between the strip-shaped sealing surfaces being at least approximately equal to each other.

24. An engine according to claim 1, which includes two pairs of interconnected working and hydrostatic pistons respectively located on opposite sides of said journal, and in which the annular body sealingly engages two sealing surface means located on opposite sides of said annular body and pertaining to said sliding body, the hydraulically effective surfaces within said sealing surface means on one side of said annular body and on the other side of said annular body at least approximately equaling each other.

25. An engine according to claim 1, which includes two pairs of interconnected working and hydrostatic pistons respectively located on opposite sides of said journal, and in which the cross-sectional areas of the hydrostatic chamber means pertaining to said hydrostatic pistons at least approximately equal each other.

26. An engine according to claim 1, which includes a first pair of interconnected working and hydrostatic pistons located on one side of said journal and a second pair of interconnected working and hydrostatic pistons located on the opposite side of said journal with at least the hydrostatic piston of the latter having a shorter diameter than the hydrostatic piston of the former, the hydraulically effective cross sections of the hydraulic systems on opposite sides of said journal differing from each other but being at least approximately equal for one and the same hydraulic system.

* * * * *